United States Patent [19]

Boileau

[11] Patent Number: 5,094,480
[45] Date of Patent: Mar. 10, 1992

[54] PIPE COUPLING WITH LEAKAGE DRAINING MEANS

[75] Inventor: Patrick A. Boileau, Yerres, France

[73] Assignee: Societe Nationale d'Etude et de Construction de Moteurs d'Aviation "S.N.E.C.M.A.", Paris, France

[21] Appl. No.: 619,349

[22] Filed: Nov. 29, 1990

[30] Foreign Application Priority Data

Nov. 29, 1989 [FR] France .................. 89 15695

[51] Int. Cl.⁵ .................................................. F16L 27/00
[52] U.S. Cl. ...................................... 285/14; 285/190; 285/276; 285/334.4
[58] Field of Search ................ 285/13, 14, 263, 276, 285/277, 334.4, 387, 388, 354, 190, 272

[56] References Cited

U.S. PATENT DOCUMENTS

| 2,263,655 | 1/1939 | Stettner | 285/388 |
|---|---|---|---|
| 2,443,394 | 5/1944 | LeClair | 285/388 |
| 3,244,440 | 4/1966 | Ashton et al. | 285/276 |
| 4,185,462 | 1/1980 | Morse, II et al. | 60/261 |
| 4,422,675 | 12/1983 | Norris et al. | 285/45 |
| 4,626,004 | 12/1986 | Geberth, Jr. | 285/122 |
| 4,679,829 | 7/1987 | Yanagisawa | 285/334.4 |

FOREIGN PATENT DOCUMENTS

| 71553 | 10/1950 | Denmark | 285/190 |
|---|---|---|---|
| 1525728 | 2/1970 | Fed. Rep. of Germany . | |
| 3428280 | 2/1985 | Fed. Rep. of Germany . | |
| 1303139 | 7/1962 | France | 285/190 |
| 2510714 | 2/1983 | France . | |
| 204900 | 10/1923 | United Kingdom . | |
| 841877 | 7/1960 | United Kingdom | 285/190 |
| 2107809 | 5/1983 | United Kingdom . | |

*Primary Examiner*—Randolph A. Reese
*Assistant Examiner*—Tim Aberle
*Attorney, Agent, or Firm*—Oblon, Spivak, McClelland, Maier & Neustadt

[57] ABSTRACT

A pipe coupling between the two pipes comprises a first end member at the end of the first pipe having a rearwardly facing shoulder and a sealing surface at its leading end, a second end member at the end of the second pipe having an external screw-threaded portion and a sealing surface at its leading end, and a clamping ring comprising an internal screw-threaded portion screwed onto the second end member and an inwardly directed collar butting against the shoulder of the first end member to hold the sealing end surfaces of the first and second end members in engagement with each other, the clamping ring defining a collection chamber for leakage from between the sealing surfaces and having an outlet port for draining away the collected leakage. The clamping ring is formed by two parts assembled so as to be freely rotatable relative to each other, the first part carrying the collar and surrounding portions of the first and second end members with sealing means therebetween, and the second part carrying the internal screw-threaded portion.

2 Claims, 1 Drawing Sheet

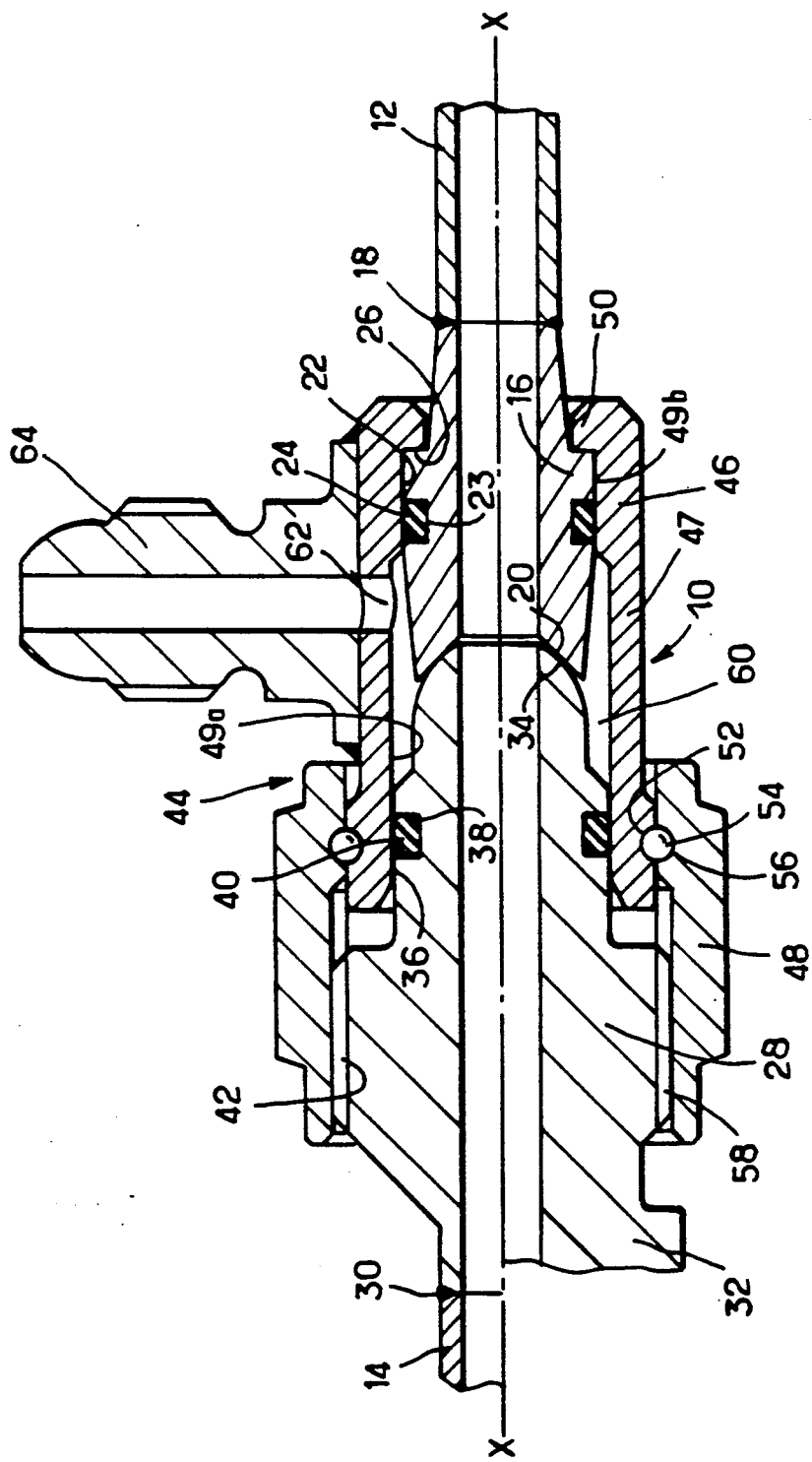

PIPE COUPLING WITH LEAKAGE DRAINING MEANS

BACKGROUND OF THE INVENTION

1. Field of the invention

The present invention relates to a pipe coupling fitted with means for draining leakage from the coupling.

In fluid distribution circuits, successive lengths of pipe are connected together by couplings which generally comprise an annular ring which is screwed onto one of the pipes and which draws the other pipe, by means of a collar, into close and fluid-tight contact with the first pipe.

When the pipes convey a dangerous fluid, for example an inflammable liquid, any leakage of fluid from the coupling could have very serious consequences, and means is provided for draining away the leaking fluid to a place where it presents no danger.

2. Description of the prior art

In connection with a fuel feed circuit for the fuel injectors of a gas turbine engine, FR-A-2510714 discloses a drainage device composed of a sleeve enclosing the entire coupling, and fluid-tight seals between the sleeve and the two pipes, the sleeve having an outlet hole communicating with a drain pipe leading to a remote, safe area.

Thanks to this sleeve, any leakage of fuel from the coupling is confined within the sleeve and can only run out through the outlet hole and the drain pipe to the remote area.

However, this is a bulky and complex device, which adds to the weight of the coupling, and the installation of which demands extra time. Furthermore, the device needs to be removed and refitted each time the coupling has to be worked on for maintenance or repair. In extreme cases, it is also possible to forget to fit, or refit, the leakage drainage sleeve.

Also known is U.S. Pat. No. 4185462, which discloses an arrangement whereby the annular coupling ring itself constitutes the drainage sleeve, but in this case it is necessary to maintain the interior of the sleeve and the drain pipe at a lower pressure than the zone outside of and surrounding the coupling and its sleeve.

In addition, the angular orientation of the outlet depends on the tightening of the coupling ring, which poses difficulties, even impossibilities, for the connection of the drainage pipe.

Also known from GB-A-2 107 809 is a coupling in which one of the pipes is terminated by a female end member having a bore with two stepped sections, and the other pipe is terminated by a male end member with two stepped surfaces fitting into the two stepped bore sections of the female member with a sealing ring surrounding each of the two surfaces of the male member. In this manner, a leakage chamber is formed in the female member between the two sections of the bore, and the chamber is connected via an outlet hole to a drain pipe.

To the extent that the main seal between the male and female members is ensured solely by the sealing ring surrounding the end of the male member, such a device can only be applied to pipes conveying liquids at low pressures.

Here also, the angular orientation of the outlet cannot be chosen freely since it depends on the manner in which the pipe with the female member is installed.

SUMMARY OF THE INVENTION

It is an object of the present invention to provide a coupling comprising means for the drainage of leaks which is as simple and safe as possible and overcomes the disadvantages of the devices described above.

To this end, according to the invention, there is provided a pipe coupling for connecting a first pipe to a second pipe, comprising a first end member fixed to the end of said first pipe, said first end member having an external shoulder facing rearwardly towards said first pipe and a sealing surface at the leading end of said first end member, a second end member fixed to the end of said second pipe, said second end member having an external screw-threaded portion and a sealing surface at the leading end of said second end member facing said sealing surface of said first end member, and a clamping ring surrounding said first and second end members, said clamping ring having an inwardly directed collar engaging said shoulder of said first end member and an internal screw-threaded portion screwed on said external screw-threaded portion of said second end member to draw said sealing surfaces of said first and second end members into engagement with each other, said clamping ring defining a collection chamber for leakage from between said engaged sealing surfaces and including an outlet port communicating with said collection chamber, said clamping ring being formed by first and second parts which are connected together so that they are rotatable relative to each other, said first part carrying said inwardly directed collar and said second part carrying said internal screw-threaded portion, said first part of said clamping ring surrounding at least a portion of said first end member and a portion of said second end member, and said coupling including sealing means between said first part and said portions of said first and second end members surrounded thereby.

Thus, the clamping ring, although constituted by two parts, forms a one-piece sub-assembly which is fitted in a single operation. In addition, only the second part of the ring rotates during the process of screwing it onto the second end member of the pipe, such that the outlet hole of the first part of the ring may be angularly orientated in any desired position for its connection to the drain pipe.

In addition, the two parts of the clamping ring are simple in shape and easy to manufacture, and the weight of the coupling is greatly reduced.

BRIEF DESCRIPTION OF THE DRAWING

The sole figure of the drawing shows a longitudinal section through a preferred embodiment of the coupling in accordance with the invention.

DESCRIPTION OF THE PREFERRED EMBODIMENT

The coupling, designated generally by the number 10, is designed to connect two pipes 12,14, or the like.

The coupling comprises a first end member 16, of a generally tubular shape, fixed to the end of the first pipe 12, for example by a weld 18, or formed integrally with the pipe. At its distal end the member 16 has a concave frusto-conical sealing surface 20, and around its circumference the member has a cylindrical bearing surface 22 which is provided with a groove 23 holding an annular sealing ring 24 and which terminates in a rearward facing shoulder 26.

The coupling further comprises a second end member 28, also of generally tubular shape, aligned with the first member 16 on the same axis XX. The end member 28 is fixed to the end of the second pipe 14, for example by a weld 30, or is formed integrally with the pipe or a component 32 in which the pipe 14 is incorporated.

At its distal end, the end member 28 has a hemispherical sealing surface 34 in contact with the frusto-conical sealing surface 20 of the first end member 16. Around its circumference, the member 28 defines, successively rearwards from its distal end, a cylindrical bearing surface 36 equipped with a groove 38 holding an annular sealing ring 40, and then a threaded surface 42.

Surrounding the two end members 16 and 28, the coupling comprises a clamping ring 44 which is formed by two parts 46,48.

The first part 46 is in the form of tubular sleeve 47 which surrounds the cylindrical bearing surfaces 22,36 of the two end members, and ends in an inwardly directed collar 50 bearing against the rearwardly facing shoulder 26 of the first end member. Around the outer periphery of the sleeve 47 there is a groove 52 which receives a rigid retaining ring 54.

The second part 48 of the ring is also in the form of a tubular sleeve, and surrounds part of the first part of the ring 46 and the second end member 28. Around its inner periphery, the second part of the ring is provided with a groove 56 which receives the rigid retaining ring 54 and an internal threaded portion 58 which is screwed onto the externally threaded portion 42 of the second end member 28.

Within the first part of the ring 46 and between the two sealing rings 24 and 40 there is defined a chamber 60 for collecting any liquid which escapes from the coupling between the two end surfaces 20 and 34 of the end members 16 and 28. The sleeve 47 of the first part of the ring is provided with an outlet port 62 opening into the chamber 60 and extending outwards in a substantially radial direction through a drainage nipple 64, as indicated in the figure, designed to receive a drain pipe which is not shown.

It will be noted that the method of assembly chosen for the two parts 46 and 48 of the clamping ring enables these two parts to act as one in the axial direction whilst allowing free rotation of each part relative to the other around the axis XX. It will of course be appreciated that, within the scope of the invention, one can replace the illustrated assembly consisting of the retaining ring 54 and its two facing grooves 52,56 by any suitable equivalent assembly which achieves the same function.

Assembly of the coupling is carried out in the following manner:

The clamping ring 44 is located on the end of the first pipe 12 and is then slid along the pipe, towards the right in the drawing, until it clears the end of the pipe 12.

The first end member 16 is fixed to the end of the pipe 12.

The second end member 28 is fixed or formed at the end of the second pipe 14 or the component 32.

The two end members are aligned and placed in contact with one another at their end surfaces 20,34.

The clamping ring 44 is slid to the left until the internal threaded portion 58 of the second part of the ring engages with the external threaded portion 42 of the second end member 28.

The second part 48 of the clamping ring is screwed onto the second end member, thus moving the whole of the clamping ring 44 towards the left in the drawing and bringing the sleeve 47 into a position surrounding the two cylindrical bearing surfaces 22,36 of the end members 16,28 to make a fluid-tight contact with the sealing rings 24,40.

During this tightening process the drainage nipple 64, as indicated in the figure, is orientated and maintained in the desired direction.

The tightening process is halted when the collar 50 comes up against the shoulder 26 of the first end member 16 and exerts on the first end member a force sufficient to ensure a good seal between the contacting frusto-conical and hemispherical end surfaces 20,34. The drainage nipple 64, as indicated in the figure, is maintained in position during the tightening operation.

The assembly is then finished, and one may note that it requires no more operations than in the fitting of a conventional type of leakage collection device.

Stripping down is effected by carrying out the same operations in the reverse order, as will be clear to the skilled man.

One can obtain quick and easy access to the end members, which enables their condition to be checked and the members to be replaced as required, the same applying to the sealing rings.

There is no need to maintain either the collecting chamber or the drain pipe at negative pressure since the chamber is totally enclosed and liquid can escape only through the port 62 and the drain pipe.

The parts making up the coupling are of simple shape, and are easily fabricated using normal machinery without the need to observe close tolerances.

To faciliate a good engagement of the sleeve 47 around the end members, the cylindrical bearing surface 36 of the second end member 28 is preferably provided with a diameter slightly greater than that of the cylindrical bearing surface 22 of the first end member 16, the internal bore 49 of the sleeve being formed with two parts with corresponding diameters 49a,49b.

Obviously, numerous modifications and variations of the present invention are possible in light of the above teachings. It is therefore to be understood that within the scope of the appended claims, the invention may be practiced otherwise than as specifically described herein.

What is claimed is:

1. A pipe coupling for connecting a first pipe to a second pipe, comprising:
    a first end member fixed to the end of said first pipe, said first end member having an external shoulder facing rearwardly towards said first pipe and a sealing surface at the leading end of said first end member,
    a second end member fixed to the end of said second pipe, said second end member having an external screw-threaded portion and a sealing surface at the leading end of said second end member facing said sealing surface of said first end member, and
    a clamping ring surrounding said first and second end members, said clamping ring having an inwardly directed collar engaging said shoulder of said first end member and an internal screw-threaded portion screwed on said external screw-threaded portion of said second end member to draw said sealing surfaces of said first and second end members into engagement with each other, said clamping ring defining a collection chamber for leakage from between said engaged sealing surfaces and including an outlet port communicating with said collection chamber and extending outward through a drainage nipple, said clamping ring being formed by first and second parts which are connected together so that said first and second parts are rotatable relative to each other, said first part carrying said inwardly directed collar and said second part carrying said internal screw-threaded portion, said first part of said clamping ring surrounding at least a portion of said first end member and a portion of said second end member, and said coupling including sealing means between said first part and said portions of said first and second end members surrounded thereby.

2. A pipe coupling according to claim 1, wherein said second part of said clamping ring surrounds a portion of said first part, and said first and second parts of said clamping ring are connected together by means of a rigid retaining ring disposed in facing external and internal grooves formed in said first and second parts respectively.

* * * * *